3,129,233
17β-ACETOXY-3-CHLORO-3,5-ANDROSTADIENE
Romano Deghenghi, Westmount, Quebec, Canada, assignor to American Home Products Corporation, New York, N.Y., a corporation of Delaware
No Drawing. Filed Aug. 28, 1961, Ser. No. 134,104
1 Claim. (Cl. 260—397.5)

This invention relates to new steroidal 3-chloro-3,5-dienes having the formula

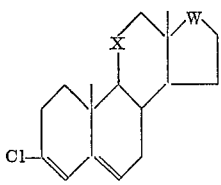

wherein W is a divalent radical having the formula

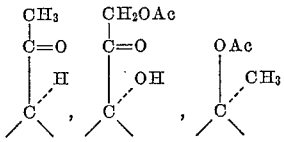

or

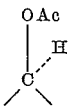

wherein Ac is an acyl radical and wherein X is either a carbonyl radical or a methylene radical, and to methods of preparing these compounds from Δ⁴-3-ketosteroids.

The new compounds of this invention are valuable by reason of their biological activities and pharmacological properties, and as chemical intermediates for use in synthesis of other steroidal compounds.

The 3-chloro-Δ³,⁵-androstadienes of this invention are valuable anabolic agents of low androgenicity; their high ratio of anabolic to androgenic activity makes them of value in treatment of persons suffering from various degenerative diseases in which improved anabolism without concomitant androgenic effects is desirable.

I have found that Δ⁴-3-ketosteroids having the formula

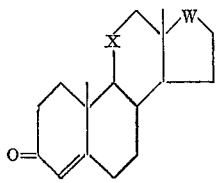

wherein W and X have the meanings above recited, when dissolved in an inert, preferably a hydrocarbon solvent, and stirred at ordinary temperatures with oxalyl chloride and a catalytic amount of an acid, such as oxalic acid, p-toluene sulfonic acid, acetic acid, succinic acid, etc., are converted in good yields to the corresponding 3-chloro steroidal 3,5-dienes.

The following examples show how this invention may be practiced.

Example 1

A solution of 10.0 g. of progesterone in 100 ml. of dry benzene was stirred at room temperature for two hours in the presence of 30 cc. oxalyl chloride and 0.5 g. oxalic acid.

The organic solvent was evaporated at reduced pressure and the residue was taken up in ether, washed with NaHCO₃ solution and water. The solvent was dried and evaporated to give crude 3-chloro-3,5-pregnadiene-20-one which was recrystallized from ether, M.P. 126–128° C., [α]_D −61° (CHCl₃).

Example 2

A quantity of 6.0 g. of 17α-methyltestosterone acetate was dissolved in 100 ml. dry benzene and stirred with 20 cc. of oxalyl chloride and 0.3 g. oxalic acid at room temperature for one and one-half hours. The reaction mixture was worked up as in Example 1 to give 17α-methyl-17β-acetoxy-3-chloro-3,5-androstadiene, M.P. 127–128° C., [α]_D −148° (CHCl₃).

Example 3

A quantity of 1.00 g. of testosterone acetate was dissolved in 25 cc. dry benzene and stirred with 5 cc. oxalyl chloride and 0.1 g. oxalic acid for one hour. The usual working up gave 17β-acetoxy-3-chloro-3,5-androstadiene, M.P. 148–152° C. (from ether), [α]_D −172° (CHCl₃).

Example 4

A quantity of 3.00 g. of cortisone acetate in 100 cc. dry benzene was stirred with 0.4 oxalic acid and 20 cc. oxalyl chloride for eighteen hours at room temperature.

The usual working up gave 21-acetoxy-17α-hydroxy-3-chloro-3,5-pregnadiene-11,20-dione, M.P. 195–197° C. (from methanol-water), [α]_D ±0° (CHCl₃).

What is claimed is:
17β-acetoxy-3-chloro-3,5-androstadiene.

No references cited.